United States Patent
Zhang et al.

(10) Patent No.: US 12,189,859 B2
(45) Date of Patent: Jan. 7, 2025

(54) METHOD FOR DRIVING VIBRATION BASED ON MICRO-TOUCH AND RELATED DEVICE

(71) Applicant: AAC Acoustic Technologies (Shanghai) Co., Ltd., Shanghai (CN)

(72) Inventors: Yanxin Zhang, Shanghai (CN); Yajun Zheng, Shanghai (CN); Shiyu Pei, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/404,830

(22) Filed: Jan. 4, 2024

(65) Prior Publication Data
US 2024/0338080 A1    Oct. 10, 2024

Related U.S. Application Data

(63) Continuation of application No. PCT/CN2023/087322, filed on Apr. 10, 2023.

(51) Int. Cl.
  *G06F 3/01* (2006.01)
  *G06F 3/04886* (2022.01)
  *H04M 1/72427* (2021.01)

(52) U.S. Cl.
  CPC .......... *G06F 3/016* (2013.01); *G06F 3/04886* (2013.01); *G06F 2203/04803* (2013.01); *H04M 1/72427* (2021.01)

(58) Field of Classification Search
  None
  See application file for complete search history.

(56) References Cited

U.S. PATENT DOCUMENTS 7,542,603 B2 * 6/2009 Rosel ............... G06T 19/00
                                                382/173
8,214,143 B2 * 7/2012 Miyajima ........ G01C 21/3652
                                                340/435

(Continued)

FOREIGN PATENT DOCUMENTS

CN    114008566 A  *  2/2022    ........... G09B 21/009
CN    116679829 A  *  9/2023

*Primary Examiner* — Patrick N Edouard
*Assistant Examiner* — Peijie Shen
(74) *Attorney, Agent, or Firm* — W&G Law Group

(57) ABSTRACT

A method for driving vibration based on micro-touch, including: acquiring, according to a given input of a touch interface, a plurality of node coordinates of a dynamic effect model corresponding to the given input and a total duration of the node coordinates; generating a dynamic effect curve according to the plurality of node coordinates and the total duration; obtaining a vibration characteristic curve from the dynamic effect curve according to a preset mapping rule; and generating a vibration driving file based on the vibration characteristic curve. The vibration driving file is configured to drive a vibrating motor to vibrate. An apparatus for driving vibration, an electronic device, and a computer-readable storage medium are also provided. The method for driving vibration based on micro-touch and the related device can achieve generation of an appropriate micro-touch interaction effect according to animation matching of application scenes, and bring better user experience.

8 Claims, 3 Drawing Sheets

(56) References Cited

U.S. PATENT DOCUMENTS

| | | | |
|---|---|---|---|
| 2008/0276793 A1* | 11/2008 | Yamashita | G10H 1/40 |
| | | | 84/611 |
| 2014/0028221 A1* | 1/2014 | Cohen | H04M 19/047 |
| | | | 318/114 |
| 2014/0078102 A1* | 3/2014 | Araki | G06F 3/04815 |
| | | | 345/174 |
| 2018/0039333 A1* | 2/2018 | Carter | G06F 3/016 |
| 2021/0064136 A1* | 3/2021 | Chassot | A63F 13/285 |
| 2021/0110841 A1* | 4/2021 | Weber | G10L 21/06 |
| 2021/0149534 A1* | 5/2021 | Song | G06T 13/80 |
| 2021/0311551 A1* | 10/2021 | Wong | G06V 30/19007 |
| 2022/0236803 A1* | 7/2022 | Sugiyama | H10N 30/082 |
| 2022/0253141 A1* | 8/2022 | Enokihara | A63F 13/285 |
| 2022/0342484 A1* | 10/2022 | Ohnishi | G06F 3/041 |
| 2023/0057783 A1* | 2/2023 | Lu | A63F 13/42 |
| 2023/0400378 A1* | 12/2023 | Xu | G06F 3/01 |
| 2024/0178771 A1* | 5/2024 | Zhu | H02P 25/06 |
| 2024/0185694 A1* | 6/2024 | Zhu | H02P 25/06 |
| 2024/0186920 A1* | 6/2024 | Zhu | G06F 3/0488 |
| 2024/0260474 A1* | 8/2024 | Qi | H10N 30/88 |
| 2024/0281067 A1* | 8/2024 | Yang | G06F 3/016 |
| 2024/0298544 A1* | 9/2024 | Chen | G06F 3/01 |

* cited by examiner

METHOD FOR DRIVING VIBRATION BASED ON MICRO-TOUCH AND RELATED DEVICE

TECHNICAL FIELD

The present disclosure relates to the technical field of vibration driving methods, and in particular, to a method for driving vibration based on micro-touch and a related device.

BACKGROUND

Touch-screen electronic device systems and (application) APP animations in electronic devices have been used more and more frequently. Micro-animation based interaction has become one of the important interaction manners in electronic device platforms, such as smart phones.

In order to enrich user experience on mobile phones, micro-interactions and vibration effects in the electronic devices are combined, and suitable touch effects are added to special interaction scenes and gestures to guide user interaction and achieve micro-touch effects, which also becomes a new application research direction.

However, in an electronic device in the related art, the vibration effect is simply a vibration driving method combined with a fixed application scene which is pre-determined, such as key vibration feedback during typing. When a new APP and a new application scene are added to the electronic device, appropriate micro-touch interaction effects cannot be generated according to animation matching of the APP and the application scene.

Therefore, there is a need to provide a new method for driving vibration based on micro-touch and a related device to solve the above technical problems.

SUMMARY

An objective of the present disclosure is to provide a method for driving vibration based on micro-touch and a related device that can generate appropriate micro-touch interaction effects according to animation matching of the APP and the application scene and effectively improve user experience.

In order to achieve the above objective, in a first aspect, the present disclosure provides a method for driving vibration based on micro-touch, including the following steps: acquiring, according to a given input of a touch interface, a plurality of node coordinates of a dynamic effect model corresponding to the given input and a total duration of the plurality of node coordinates; generating a dynamic effect curve according to the plurality of node coordinates and the total duration; obtaining a vibration characteristic curve from the dynamic effect curve according to a preset mapping rule; and generating a vibration driving file according to the vibration characteristic curve. The vibration driving file is configured to drive a vibrating motor to vibrate.

As an improvement, the step of generating a dynamic effect curve according to the plurality of node coordinates and the total duration includes the following sub-steps: generating, according to the plurality of node coordinates $P_n=(x_n, y_n)$ and the total duration, dynamic effect curve trajectory coordinates corresponding to a time t, and obtaining a dynamic effect curve trajectory according to the dynamic effect curve trajectory coordinates, where n is a positive integer greater than 1; and performing first-order derivation on the dynamic effect curve trajectory to obtain x-direction velocities and y-direction velocities, so as to obtain the time t of the dynamic effect curve trajectory and an x-direction velocity $Xvel(t)$ and the y-direction velocity $Yvel(t)$ of the curve trajectory corresponding to the time t and then generate the dynamic effect curve.

As an improvement, in the step of acquiring, according to a given input of a touch interface, a plurality of node coordinates of a dynamic effect model corresponding to the given input and a total duration of the plurality of node coordinates, 4 node coordinates are acquired.

As an improvement, the step of obtaining a vibration characteristic curve from the dynamic effect curve according to a preset mapping rule includes: generating, according to the dynamic effect curve, an x-direction time-velocity curve and a y-direction time-velocity curve corresponding to the time t; causing, according to the x-direction velocity $Xvel(t)$ and a preset relative frequency interval $[f\_min, f\_max]$, the x-direction velocity $Xvel(t)$ to maintain its own velocity trend based on the x-direction time-velocity curve and to be simultaneously mapped to the preset relative frequency interval $[f\_min, f\_max]$, so that a maximum value of the x-direction velocity $Xvel(t)$ is mapped to $f\_max$, and a minimum value of the x-direction velocity $Xvel(t)$ is mapped to $f\_min$, and finally generating a vibration time-frequency curve; mapping, according to the y-direction velocity $Yvel(t)$ and a preset relative intensity interval $[0, 1]$, the y-direction velocity $Yvel(t)$ to the preset relative intensity interval $[0, 1]$, so that a maximum value of the y-direction velocity $Yvel(t)$ is mapped to 1, and a minimum value of the y-direction velocity $Yvel(t)$ is mapped to 0, and performing weighting to finally generate a vibration time-intensity curve; and taking the vibration time-frequency curve and the vibration time-intensity curve as the vibration characteristic curve.

As an improvement, the step of generating a vibration driving file based on the vibration characteristic curve includes: generating event node information according to the vibration characteristic curve, and writing the event node information into a readable vibration format file, so as to generate the vibration driving file.

As an improvement, in the step of causing the x-direction velocity $Xvel(t)$ to maintain its own velocity trend based on the x-direction time-velocity curve and to be simultaneously mapped to the preset relative frequency interval $[f\_min, f\_max]$, a corresponding mapping function is a monotonic function, and a function form includes linear mapping and nonlinear mapping; and in the step of mapping the y-direction velocity $Yvel(t)$ to the preset relative intensity interval $[0, 1]$, a corresponding mapping function is a monotonic function, and a function form includes linear mapping and nonlinear mapping.

As an improvement, the dynamic effect model is one of a third-order Bezier curve animation model, an RK4 animation model, or a DHO animation model.

In a second aspect, the present disclosure further provides an apparatus for driving vibration, including: an acquisition module configured to acquire, according to a given input of a touch interface, a plurality of node coordinates of a dynamic effect model corresponding to the given input and a total duration of the plurality of node coordinates; a dynamic effect curve generation module configured to generate a dynamic effect curve according to the plurality of node coordinates and the total duration; a vibration characteristic curve generation module configured to obtain a vibration characteristic curve from the dynamic effect curve according to a preset mapping rule; and a vibration file generation module configured to generate a vibration driving file according to the vibration characteristic curve. The vibration driving file is configured to drive a vibrating motor to vibrate.

In a third aspect, the present disclosure further provides an electronic device, including a processor, a memory, and a vibration driving program stored in the memory and executable by the processor. When the vibration driving program is executed by the processor, steps in the method for driving vibration based on micro-touch as described above are implemented.

In a fourth aspect, the present disclosure further provides a computer-readable storage medium. The computer-readable storage medium stores a vibration driving program, and when the vibration driving program is executed by a processor, steps in the method for driving vibration based on micro-touch as described above are implemented.

Compared with the related art, in the method for driving vibration based on micro-touch and the related device in the present disclosure, dynamic effect models of APPS and application scenes are read, dynamic effect curves thereof are obtained, and the dynamic effect curves and touch effects are mapped and bound in conjunction with a preset mapping rule, thereby generating vibration driving files corresponding to different dynamic effect models and achieving different driving effects, which realizes an interaction mode of binding and combining animations and touches, and sets animation parameters of the dynamic effect models, which can also automatically generate appropriate touch effects according to set parameters of the dynamic effect models, and effectively improves user experience.

BRIEF DESCRIPTION OF DRAWINGS

In order to better illustrate the technical solutions in the embodiments of the present disclosure, the accompanying drawings to be used in the description of the embodiments will be introduced below. It is appreciated that, the accompanying drawings in the following description are only some embodiments of the present disclosure. For those of ordinary skill in the art, other accompanying drawings can be obtained based on these drawings without creative efforts. In the drawings.

DESCRIPTION OF EMBODIMENTS

The technical solutions in the embodiments of the present disclosure will be clearly and completely described below with reference to the accompanying drawings in the embodiments of the present disclosure. It is appreciated that, the described embodiments are only some of the embodiments of the present disclosure, but not all of the embodiments. Based on the embodiments of the present disclosure, all other embodiments obtained by those of ordinary skill in the art without creative efforts fall within the protection scope of the present disclosure.

Embodiment 1

Figure 1:
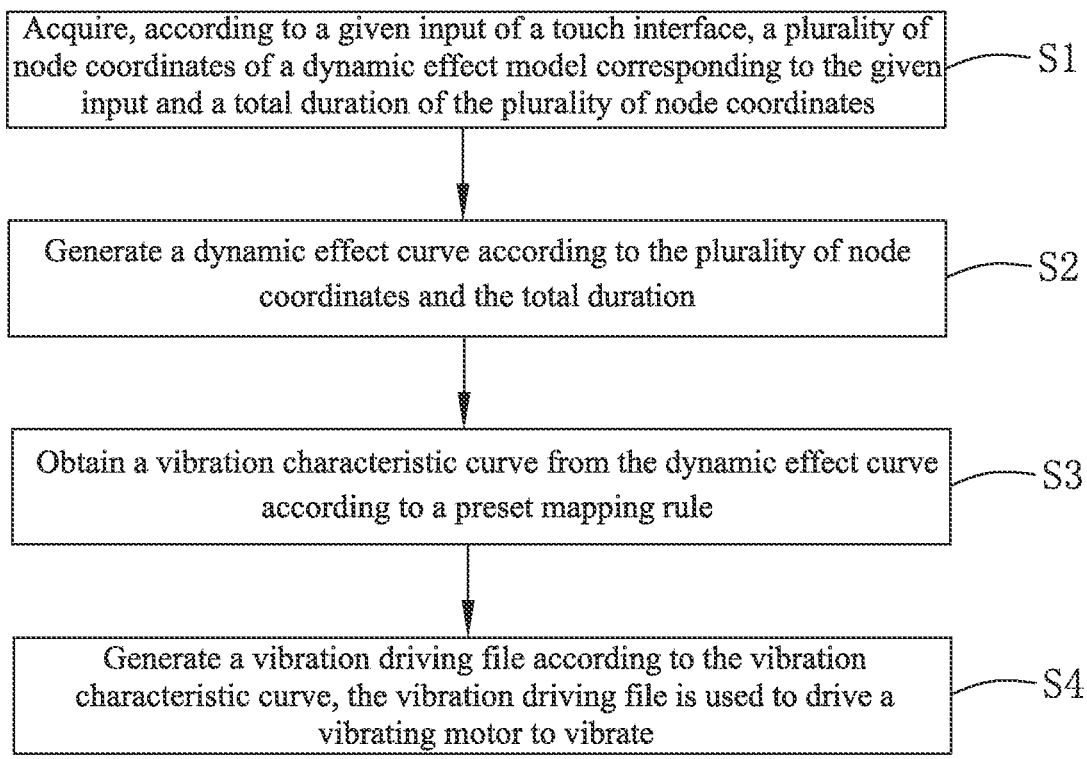
FIG. 1 is a flowchart block diagram of a method for driving vibration based on micro-touch according to an embodiment of the present disclosure.

Referring to FIG. 1, this embodiment of the present disclosure provides a method for driving vibration based on micro-touch, applied to touch electronic terminals, such as a mobile phone or a tablet computer. The method includes the following steps.

In S1, according to a given input of a touch interface, a plurality of node coordinates Pn of a dynamic effect model corresponding to the given input and a total duration dur of the plurality of node coordinates Pn are acquired, where n is a positive integer greater than 1.

The given input may be a dynamic effect within an APP, an internal operating system of the electronic terminal, or the like.

In this step, the type of the dynamic effect model is not limited herein, which may be a third-order Bezier curve animation model, an RK4 animation model, a DHO animation model, or the like. In this embodiment, the following detailed description is based on an example in which the dynamic effect model is the third-order Bezier curve animation model. The number of the acquired node coordinates of the dynamic effect model corresponding to the given input is 4, but is not limited to 4.

In S2, a dynamic effect curve is generated according to the plurality of node coordinates and the total duration.

This step S2 includes the following sub-steps.

In S21, Bezier curve trajectory coordinates (i.e., dynamic effect curve trajectory coordinates) corresponding to a time t are generated according to the plurality of node coordinates Pn=(xn, yn) and the total duration dur, and a Bezier curve trajectory (i.e., a dynamic effect curve trajectory) is obtained according to the Bezier curve trajectory coordinates, where n is a positive integer greater than 1.

For example, 4 node coordinates are provided. That is, the acquired node coordinates are P1=(x1, y1), P2=(x2, y2), P3=(x3, y3), and P4=(x4, y4).

In S22, first-order derivation is performed on the Bezier curve trajectory to obtain x-direction velocities and y-direction velocities, so as to obtain the time t of the Bezier curve trajectory and an x-direction velocity Xvel(t) and the y-direction velocity Yvel(t) of the Bezier curve trajectory corresponding to the time t and then generate the Bezier curve (i.e., the dynamic effect curve).

In S3, a vibration characteristic curve is obtained from the dynamic effect curve according to a preset mapping rule.

This step S3 includes the following sub-steps.

In S31, an x-direction time-velocity curve and a y-direction time-velocity curve corresponding to the time t are generated according to the Bezier curve (i.e., the dynamic effect curve).

In S32, according to the x-direction velocity Xvel(t) and a preset relative frequency interval [f_min, f_max], the x-direction velocity Xvel(t) is caused to maintain its own velocity trend based on the x-direction time-velocity curve and to be simultaneously mapped to the preset relative frequency interval [f_min, f_max], so that a maximum value of the x-direction velocity Xvel(t) is mapped to f_max, a minimum value of the x-direction velocity Xvel(t) is mapped to f_min. The corresponding mapping function is a monotonic function, the function form includes linear mapping and nonlinear mapping, and a vibration time-frequency curve is finally generated.

In S33, according to the y-direction velocity Yvel(t) and a preset relative intensity interval [0, 1], the y-direction velocity Yvel(t) is mapped to the preset relative intensity interval [0, 1], so that a maximum value of the y-direction velocity Yvel(t) is mapped to 1, and a minimum value of the y-direction velocity Yvel(t) is mapped to 0. Weighting is performed on this basis to increase volatility, a corresponding mapping function is a monotonic function, the function form includes linear mapping and nonlinear mapping, and a vibration time-intensity curve is finally generated.

It is to be noted that S32 and S33 are interchangeable in their orders.

In S34, a vibration time-frequency curve and a vibration time-intensity curve are taken as the vibration characteristic curve.

In S4, a vibration driving file is generated according to the vibration characteristic curve, the vibration driving file is used to drive a vibrating motor to vibrate.

This step S4 includes: generating event node information according to the vibration characteristic curve, and writing the event node information into a readable vibration format file, so as to generate the vibration driving file.

For example, the method in this embodiment is applied to a mobile phone. Micro-interaction between the "micro-touch" vibration manner and the APP or operating system in the mobile phone realized in the above method is to combine various animation models and touches in the operating system or APP of the mobile phone to establish a mapping relationship between touch effects and animation models, and to realize a combination of micro-animations by modifying various animation models and also modifying touch vibration effects. Appropriate touch effects are added to special interaction scenes and gestures to guide user interaction, thereby effectively enriching user experience. For example, animation models and touch effects are mapped and bound by switching left and right cards, delete, or like, so that animation parameters are set for an interface interactive control, and an appropriate touch effect can also be automatically generated according to set animation model parameters, which achieves deep animation-touch binding.

Compared with the related art, in the method for driving vibration based on micro-touch in the present disclosure, dynamic effect models of APPs and application scenes are read, dynamic effect curves thereof are obtained, and the dynamic effect curves and touch effects are mapped and bound in conjunction with the preset mapping rule, thereby generating vibration driving files corresponding to different dynamic effect models and achieving different driving effects, which realizes an interaction mode of binding and combining animations and touches, and sets animation parameters of the dynamic effect models, which can also automatically generate appropriate tactile effects according to set parameters of the dynamic effect models (that is, touches are combined with various dynamic effect models (such as the third-order Bezier curve model, the RK4 animation model, and the DHO animation model) to provide users with new experience, and new touch interaction is performed through animation model-tactile parameter mapping), thereby effectively improving user experience.

Embodiment 2

Figure 2:
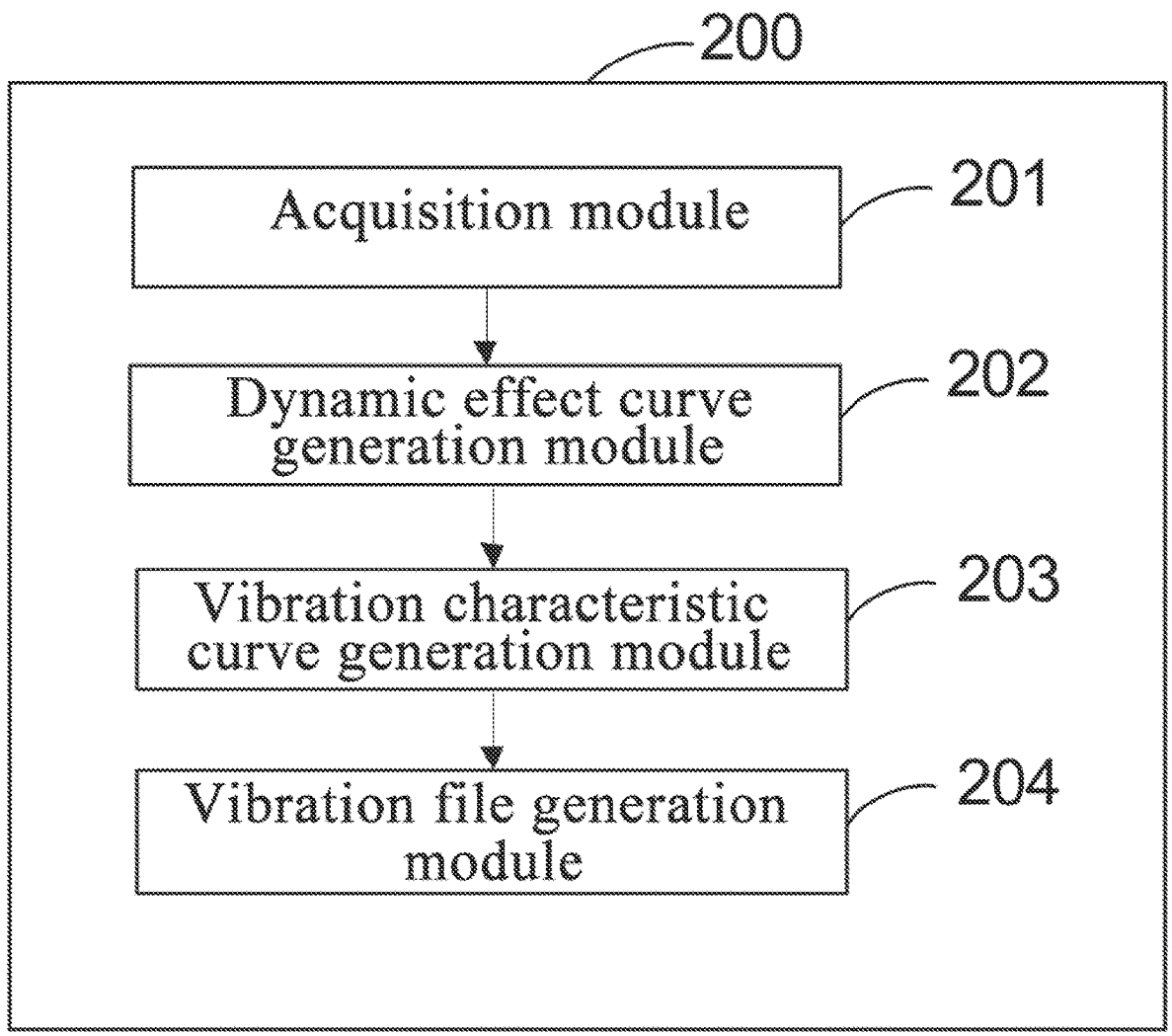
FIG. 2 is a structural block diagram of an apparatus for driving vibration according to an embodiment of the present disclosure.
Figure 3:
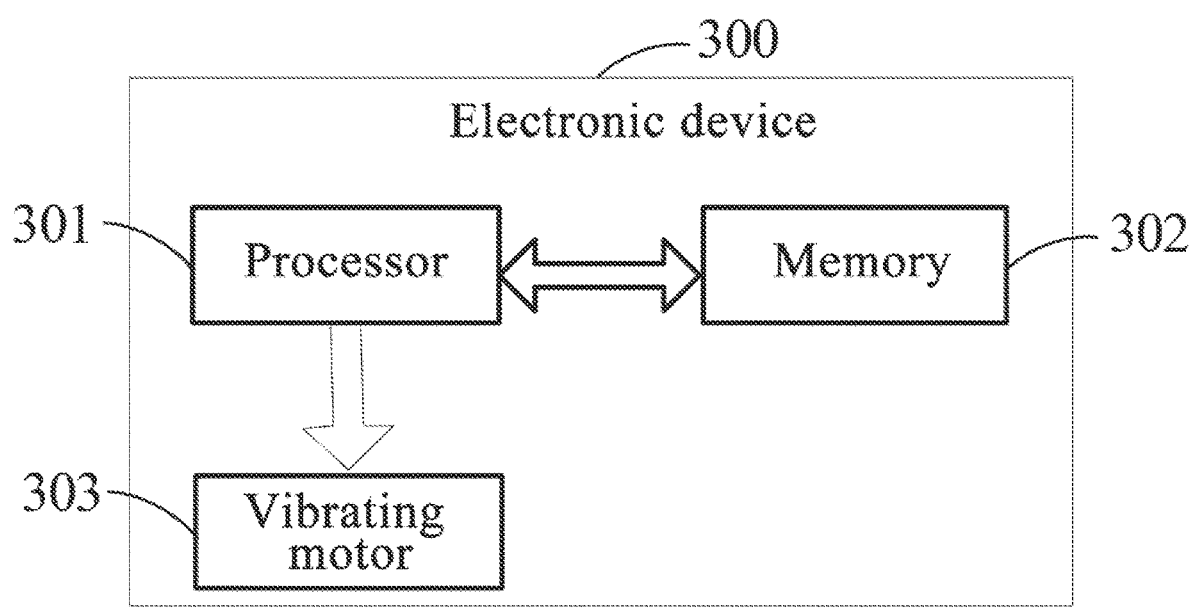
FIG. 3 is a structural block diagram of an electronic device according to an embodiment of the present disclosure.

Referring to FIG. 2, an embodiment of the present disclosure further provides an apparatus for driving vibration 200, including: an acquisition module 201, a dynamic effect curve generation module 202, a vibration characteristic curve generation module 203, and a vibration file generation module 204.

The acquisition module 201 is configured to acquire, according to a given input of a touch interface, a plurality of node coordinates of a dynamic effect model corresponding to the given input and a total duration of the plurality of node coordinates.

The dynamic effect curve generation module 202 is configured to generate a dynamic effect curve according to the plurality of node coordinates and the total duration.

The type of the dynamic effect model is not limited herein, which may be a third-order Bezier curve animation model, an RK4 animation model, a DHO animation model, or the like. In this embodiment, the following detailed description is based on an example in which the dynamic effect model is the third-order Bezier curve animation model. The number of the acquired node coordinates of the dynamic effect model corresponding to the given input is 4, but is not limited to 4.

The dynamic effect curve generation module 202 generates Bezier curve trajectory coordinates (i.e., dynamic effect curve trajectory coordinates) corresponding to a time t according to the plurality of node coordinates $Pn=(xn, yn)$ and the total duration dur, and obtains a Bezier curve trajectory (i.e., a dynamic effect curve trajectory) according to the Bezier curve trajectory coordinates; where n is a positive integer greater than 1. For example, 4 node coordinates are provided. That is, the acquired node coordinates are $P1=(x1, y1)$, $P2=(x2, y2)$, $P3=(x3, y3)$, and $P4=(x4, y4)$. Then, the dynamic effect curve generation module 202 performs first-order derivation on the Bezier curve trajectory to obtain x-direction velocities and y-direction velocities, so as to obtain the time t of the Bezier curve trajectory and an x-direction velocity $Xvel(t)$ and the y-direction velocity $Yvel(t)$ of the Bezier curve trajectory corresponding to the time t and then generate the Bezier curve (i.e., the dynamic effect curve).

The vibration characteristic curve generation module 203 is configured to obtain a vibration characteristic curve from the dynamic effect curve according to a preset mapping rule.

Firstly, the vibration characteristic curve generation module 203 generates, according to the Bezier curve (i.e., the dynamic effect curve), an x-direction time-velocity curve and a y-direction time-velocity curve corresponding to the time t. Then, the vibration characteristic curve generation module 203 causes, according to the x-direction velocity $Xvel(t)$ and a preset relative frequency interval [f_min, f_max], the x-direction velocity $Xvel(t)$ to maintain its own velocity trend based on the x-direction time-velocity curve and to be simultaneously mapped to the preset relative frequency interval [f_min, f_max], so that a maximum value of the x-direction velocity $Xvel(t)$ is mapped to f_max, a minimum value of the x-direction velocity $Xvel(t)$ is mapped to f_min. The corresponding mapping function is a monotonic function, and the function form includes linear mapping and nonlinear mapping, and finally a vibration time-frequency curve is generated. At the same time, the vibration characteristic curve generation module 203 maps, according to the y-direction velocity $Yvel(t)$ and a preset relative intensity interval [0, 1], the y-direction velocity $Yvel(t)$ is mapped to the preset relative intensity interval [0, 1], so that a maximum value of the y-direction velocity $Yvel(t)$ is mapped to 1, and a minimum value of the y-direction velocity $Yvel(t)$ is mapped to 0, and performs weighting on this basis to increase volatility. The corresponding mapping function is a monotonic function, and the function form includes linear mapping and nonlinear mapping, and finally a vibration time-intensity curve is generated. Finally, the characteristic curve generation module 203 takes a vibration time-frequency curve and a vibration time-intensity curve as the vibration characteristic curve.

The vibration file generation module 204 is configured to generate a vibration driving file according to the vibration characteristic curve. The vibration driving file is used to drive a vibrating motor to vibrate. The vibration file generation module 204 generates event node information according to the vibration characteristic curve, and writes the event node information into a readable vibration format file, so as to generate the vibration driving file.

In this embodiment, the technical effect achieved by the apparatus for driving vibration 200 is the same as that achieved by the method for driving vibration based on micro-touch provided above in the present disclosure. Details are not described herein again.

Embodiment 3

An embodiment of the present disclosure further provides an electronic device 300, including a processor 301, a memory 302, and a vibration driving program stored in the memory 302 and executable by the processor 301. When the vibration driving program is executed by the processor 301, steps in the method for driving vibration based on micro-touch as provided above in the present disclosure are implemented.

According to a given input of a touch interface, a plurality of node coordinates Pn of a dynamic effect model corresponding to the given input and a total duration dur of the plurality of node coordinates Pn are acquired, where n is a positive integer greater than 1.

A dynamic effect curve is generated according to the plurality of node coordinates and the total duration. Bezier curve trajectory coordinates (i.e., dynamic effect curve trajectory coordinates) corresponding to a time t are generated according to the plurality of node coordinates Pn=(xn, yn) and the total duration dur, and a Bezier curve trajectory (i.e., a dynamic effect curve trajectory) is obtained according to the Bezier curve trajectory coordinates; where n is a positive integer greater than 1. For example, 4 node coordinates are provided. That is, the acquired node coordinates are P1=(x1, y1), P2=(x2, y2), P3=(x3, y3), and P4=(x4, y4). Then, first-order derivation is performed on the Bezier curve trajectory to obtain x-direction velocities and y-direction velocities, so as to obtain the time t of the Bezier curve trajectory and an x-direction velocity Xvel(t) and the y-direction velocity Yvel(t) of the Bezier curve trajectory corresponding to the time t and then generate the Bezier curve (i.e., the dynamic effect curve).

A vibration characteristic curve is obtained from the dynamic effect curve according to a preset mapping rule. Specifically, according to the Bezier curve (i.e., the dynamic effect curve), an x-direction time-velocity curve and a y-direction time-velocity curve corresponding to the time t are first generated. Then, according to the x-direction velocity Xvel(t) and a preset relative frequency interval [f_min, f_max], the x-direction velocity Xvel(t) is caused to maintain its own velocity trend based on the x-direction time-velocity curve and to be simultaneously mapped to the preset relative frequency interval [f_min, f_max], so that a maximum value of the x-direction velocity Xvel(t) is mapped to f_max, a minimum value of the x-direction velocity Xvel(t) is mapped to f_min. The corresponding mapping function is a monotonic function, and the function form includes linear mapping and nonlinear mapping, and a vibration time-frequency curve is finally generated. According to the y-direction velocity Yvel(t) and a preset relative intensity interval [0, 1], the y-direction velocity Yvel(t) is mapped to the preset relative intensity interval [0, 1], so that a maximum value of the y-direction velocity Yvel(t) is mapped to 1, and a minimum value of the y-direction velocity Yvel(t) is mapped to 0. Weighting is performed on this basis to increase volatility. The corresponding mapping function is a monotonic function, and the function form includes linear mapping and nonlinear mapping, and a vibration time-intensity curve is finally generated. Finally, a vibration time-frequency curve and a vibration time-intensity curve are taken as the vibration characteristic curve.

A vibration driving file is generated according to the vibration characteristic curve. The vibration driving file is used to drive a vibrating motor to vibrate.

It is to be noted that the electronic device 300 further includes a vibrating motor 303. When the vibration driving program is executed by the processor 301, according to the vibration driving file generated by mapping of the dynamic effect model of the given input, the processor 301 directly drives the vibrating motor 303 to achieve animation-touch interaction. In other words, in use, the electronic device 300 can achieve the technical effect achieved by the method for driving vibration based on micro-touch as described above. Please refer to the description of the method for driving vibration based on micro-touch above for details, which are not described herein again.

Embodiment 4

An embodiment of the present disclosure further provides a computer-readable storage medium. The computer-readable storage medium stores a vibration driving program. When the vibration driving program is executed by the processor, steps in the method for driving vibration based on micro-touch as provided above in the present disclosure are implemented. Therefore, the technical effect achieved is the same as that achieved by the method for driving vibration based on micro-touch. Details are not described herein again.

The above are merely the embodiments of the present disclosure. It should be noted herein that, for those of ordinary skill in the art, improvements can be made without departing from the creative concept of the present disclosure, but these all fall within the protection scope of the present disclosure.

What is claimed is:

1. A method for driving vibration based on micro-touch, comprising following steps:
    acquiring, according to a given input of a touch interface, a plurality of node coordinates of a dynamic effect model corresponding to the given input and a total duration of the plurality of node coordinates;
    generating a dynamic effect curve according to the plurality of node coordinates and the total duration;
    wherein the generating a dynamic effect curve according to the plurality of node coordinates and the total duration specifically comprises following sub-steps:
    generating, according to the plurality of node coordinates Pn=(xn, yn) and the total duration, dynamic effect curve trajectory coordinates corresponding to a time t, and obtaining a dynamic effect curve trajectory according to the dynamic effect curve trajectory coordinates, where n is a positive integer greater than 1; and
    performing first-order derivation on the dynamic effect curve trajectory to obtain x-direction velocities and y-direction velocities, so as to obtain the time t of the dynamic effect curve trajectory and an x-direction velocity Xvel(t) and the y-direction velocity Yvel(t) of the curve trajectory corresponding to the time t;
    obtaining a vibration characteristic curve from the dynamic effect curve according to a preset mapping rule; wherein the vibration characteristic curve comprises a vibration time-frequency curve generated based on one of Xvel(t) and Yvel(t) and a vibration time-intensity curve generated based on another one of Xvel(t) and Yvel(t);

generating a vibration driving file according to the vibration characteristic curve, wherein the vibration driving file is configured to drive a vibrating motor to vibrate.

2. The method for driving vibration based on micro-touch as described in claim 1, wherein, in the acquiring, according to a given input of a touch interface, a plurality of node coordinates of a dynamic effect model corresponding to the given input and a total duration of the plurality of node coordinates, 4 node coordinates are acquired.

3. The method for driving vibration based on micro-touch as described in claim 1, wherein the obtaining a vibration characteristic curve from the dynamic effect curve according to a preset mapping rule comprises:

generating, according to the dynamic effect curve, an x-direction time-velocity curve and a y-direction time-velocity curve corresponding to the time t;

causing, according to the x-direction velocity Xvel(t) and a preset relative frequency interval [f_min, f_max], the x-direction velocity Xvel(t) to maintain its own velocity trend based on the x-direction time-velocity curve and to be simultaneously mapped to the preset relative frequency interval [f_min, f_max], so that a maximum value of the x-direction velocity Xvel(t) is mapped f_max, and a minimum value of the x-direction velocity Xvel(t) is mapped to f_min, to generate the vibration time-frequency curve;

mapping, according to the y-direction velocity Yvel(t) and a preset relative intensity interval [0, 1], the y-direction velocity Yvel(t) to the preset relative intensity interval [0, 1], so that a maximum value of the y-direction velocity Yvel(t) is mapped to 1, and a minimum value of the y-direction velocity Yvel(t) is mapped to 0, and performing weighting to generate the vibration time-intensity curve; and taking the vibration time-frequency curve and the vibration time-intensity curve as the vibration characteristic curve.

4. The method for driving vibration based on micro-touch as described in claim 3, wherein the generating a vibration driving file based on the vibration characteristic curve comprises:

generating event node information according to the vibration characteristic curve, and writing the event node information into a readable vibration format file, so as to generate the vibration driving file.

5. The method for driving vibration based on micro-touch as described in claim 3, wherein in the causing the x-direction velocity Xvel(t) to maintain its own velocity trend based on the x-direction time-velocity curve and to be simultaneously mapped to the preset relative frequency interval [f min, f max], a corresponding mapping function is a monotonic function, and a function form comprises linear mapping and nonlinear mapping; and in the mapping the y-direction velocity Yvel(t) to the preset relative intensity interval [0,1], a corresponding mapping function is a monotonic function, and a function form comprises linear mapping and nonlinear mapping.

6. The method for driving vibration based on micro-touch as described in claim 1, wherein the dynamic effect model is one of a third-order Bezier curve animation model, an RK4 animation model, or a DHO animation model.

7. An apparatus for driving vibration, comprising:
at least one processor; and
a memory configured to store instructions executable by the at least one processor; wherein the instructions cause the at least one processor to:
acquire, according to a given input of a touch interface, a plurality of node coordinates of a dynamic effect model corresponding to the given input and a total duration of the plurality of node coordinates;
wherein the generating a dynamic effect curve according to the plurality of node coordinates and the total duration specifically comprises following sub-steps:
generating, according to the plurality of node coordinates Pn=(xn, yn) and the total duration, dynamic effect curve trajectory coordinates corresponding to a time t, and obtaining a dynamic effect curve trajectory according to the dynamic effect curve trajectory coordinates, where n is a positive integer greater than 1; and
performing first-order derivation on the dynamic effect curve trajectory to obtain x-direction velocities and y-direction velocities, so as to obtain the time t of the dynamic effect curve trajectory and an x-direction velocity Xvel(t) and the y-direction velocity Yvel(t) of the curve trajectory corresponding to the time t;
generate a dynamic effect curve according to the plurality of node coordinates and the total duration; wherein the vibration characteristic curve comprises a vibration time-frequency curve generated based on one of Xvel (t) and Yvel(t) and a vibration time-intensity curve generated based on another one of Xvel(t) and Yvel(t);
obtain a vibration characteristic curve from the dynamic effect curve according to a preset mapping rule; and
generate a vibration driving file based on the vibration characteristic curve, wherein the vibration driving file is configured to drive a vibrating motor to vibrate.

8. A non-transitory computer-readable storage medium, wherein the computer-readable storage medium stores a vibration driving program, and when the vibration driving program is executed by a processor, steps in the method for driving vibration based on micro-touch as described in claim 1 are implemented.

* * * * *